United States Patent
Wang et al.

(10) Patent No.: US 8,842,157 B2
(45) Date of Patent: Sep. 23, 2014

(54) METHOD, APPARATUS, AND SYSTEM FOR IMPLEMENTING VIDEOCONFERENCING APPLICATION

(71) Applicant: Huawei Device Co., Ltd., Guangdong (CN)

(72) Inventors: Zhifu Wang, Shenzhen (CN); Gengsheng Xie, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 138 days.

(21) Appl. No.: 13/720,561

(22) Filed: Dec. 19, 2012

(65) Prior Publication Data

US 2013/0106987 A1 May 2, 2013

Related U.S. Application Data

(63) Continuation of application No. PCT/CN2011/078989, filed on Aug. 26, 2011.

(30) Foreign Application Priority Data

Sep. 6, 2010 (CN) .......................... 2010 1 0273019

(51) Int. Cl.
*H04N 7/15* (2006.01)
*H04M 3/56* (2006.01)
*H04L 12/18* (2006.01)
*H04M 3/42* (2006.01)

(52) U.S. Cl.
CPC ............. *H04N 7/15* (2013.01); *H04M 3/42348* (2013.01); *H04M 3/567* (2013.01); *H04L 12/1818* (2013.01)
USPC .................. 348/14.08; 348/14.09; 348/14.12; 370/260

(58) Field of Classification Search
CPC ........... H04N 7/15; H04N 7/14; H04N 7/141; H04N 7/142; H04N 7/147; H04N 7/148; H04N 7/152; H04L 12/1818; H04M 3/567; H04M 3/42348
USPC ..................... 348/14.01–14.16; 370/260–261
See application file for complete search history.

(56) References Cited

U.S. PATENT DOCUMENTS

| | | | |
|---|---|---|---|
| 5,717,863 A | * | 2/1998 | Adamson et al. ............. 709/204 |
| 7,221,658 B1 | | 5/2007 | Armstrong et al. |

(Continued)

FOREIGN PATENT DOCUMENTS

| | | |
|---|---|---|
| CN | 1411278 A | 4/2003 |
| CN | 1893630 A | 1/2007 |

(Continued)

OTHER PUBLICATIONS

Written Opinion of the International Searching Authority in corresponding PCT Patent Application No. PCT/CN2011/078989 (Dec. 8, 2011).

(Continued)

*Primary Examiner* — Melur Ramakrishnaiah
(74) *Attorney, Agent, or Firm* — Leydig, Voit & Mayer, Ltd.

(57) ABSTRACT

The present invention provides a method, an apparatus, and a system for implementing a videoconferencing application and relates to the field of communications technologies. The videoconferencing system can provide an application related to the geographic location of each participant, including: obtaining an address of at least one conference site by performing resolving; acquiring information related to the address of the conference site according to the address of the conference site; and sending the related information to one or more of the conference sites, where the related information is used to provide a reference for a user to attend a conference. When a conference is held by using the videoconferencing system, the videoconferencing system can provide an application related to the geographic location of each participant, enriching service functions that the videoconferencing system can provide and improving the user satisfaction.

14 Claims, 2 Drawing Sheets

(56) References Cited

U.S. PATENT DOCUMENTS

| | | | |
|---|---|---|---|
| 2004/0239754 A1 | 12/2004 | Shachar et al. | |
| 2006/0233120 A1* | 10/2006 | Eshel et al. | 370/260 |
| 2007/0070186 A1 | 3/2007 | Fujimori et al. | |
| 2007/0286208 A1 | 12/2007 | Kanada et al. | |
| 2008/0266383 A1 | 10/2008 | Shah et al. | |

FOREIGN PATENT DOCUMENTS

| | | |
|---|---|---|
| CN | 101090324 A | 12/2007 |
| CN | 101534412 A | 9/2009 |
| CN | 101674452 A | 3/2010 |
| CN | 101677397 A | 3/2010 |
| CN | 101945245 A | 1/2011 |
| EP | 1324608 A2 | 7/2003 |
| WO | WO 0004693 A2 | 1/2000 |
| WO | WO 03052611 A1 | 6/2003 |
| WO | WO 2008033030 A1 | 3/2008 |

OTHER PUBLICATIONS $2^{nd}$ Office Action in corresponding Chinese Patent Application No. 201010273019.5 (Oct. 10, 2012).

International Search Report in corresponding International Patent Application No. PCT/CN2011/078989 (Dec. 8, 2011).

* cited by examiner

METHOD, APPARATUS, AND SYSTEM FOR IMPLEMENTING VIDEOCONFERENCING APPLICATION

CROSS-REFERENCE TO RELATED APPLICATIONS

This application is a continuation of International Patent Application No. PCT/CN2011/078989, filed on Aug. 26, 2011, which claims priority to Chinese Patent Application No. 201010273019.5, filed on Sep. 6, 2010, both of which are hereby incorporated by reference in their entireties.

FIELD OF TECHNOLOGY

The present invention relates to the field of communications technologies, and in particular to a method, an apparatus, and a system for implementing a videoconferencing application.

BACKGROUND

With the development of the world politics, economy, and technologies, the conference mode, that is, holding a global or regional conference and participants around the world coming together in a main conference site, has been gradually replaced by a booming video conference.

Currently, conference information about moving pictures, voice, application data (electronic whiteboard and graphs), and the like can be transmitted between two conference sites or more conference sites in real time by using a videoconferencing system, implementing instant and interactive communication, and finally achieving a conference purpose. When each conference site is to be accessed, the videoconferencing system has the capability to support many different access modes. For example, each conference site may be accessed through a PSTN (Public Switched Telephone Network) telephone network, an ISDN (Integrated Services Digital Network) digital network, or an El (European 30 channel pulse code modulation PCM) dedicated network and a conference may also be accessed through an IP (Internet Protocol) network or a wireless network such as a 2G (Second Generation, second-generation mobile communications technology)/3G (3rd-Generation, third-generation mobile communications technology)/4G (fourth-generation mobile communications and the technology), and the like.

Generally, the geographic locations of participants who attend a video conference are different. For example, the video conference may be held between several countries or regions and may also be implemented between several continents. When the locations of participants are different, the time, weather or custom, and the like are also different. When each participant accesses the conference using different access modes, the existing videoconferencing system cannot provide an application related to the geographic location.

SUMMARY OF THE INVENTION

The present invention provides a method, an apparatus, and a system for implementing a videoconferencing application. The videoconferencing system can provide an application related to the geographic location of each participant.

To achieve the preceding objectives, the embodiments of the present invention adopt the following technical solutions:

A method for implementing a videoconferencing application, including:
 obtaining an address of at least one conference site by performing resolving;
 acquiring information related to the address of the conference site according to the address of the conference site; and
 sending the related information to one or more of conference sites, where the related information is used to provide a reference for a user to attend a conference.

A videoconferencing apparatus, including:
 a resolving unit, configured to obtain an address of at least one conference site by performing resolving;
 a first processing unit, configured to acquire information related to the address of the conference site according to the address of the conference site; and
 a sending unit, configured to send the related information to one or more of conference sites, where the related information is used to provide a reference for a user to attend a conference.

A videoconferencing system, including:
 the videoconferencing apparatus, configured to obtain an address of at least one conference site by performing resolving, acquire information related to the address of the conference site according to the address of the conference site, and send the related information to one or more of conference sites, where the related information is used to provide a reference for a user to attend a conference;
 and the conference site accesses the videoconferencing apparatus using a videoconferencing terminal; and
 the videoconferencing terminal, configured to receive the related information sent by the videoconferencing apparatus and provide the related information for the user who attends the conference.

The embodiments of the present invention according to the technical solution are capable of obtaining the address of the conference site by performing resolving and capable of acquiring information related to the conference site according to the address of the conference site when a conference site is accessed, where the related information is used to provide a reference for a user to attend a conference.

In the embodiments of the present invention, the address of a conference site can be obtained by performing resolving, that is, the location of each participant can be known, and information related to the address of the conference site can be acquired according to the address of the conference site, where the related information may be used to provide a reference for a user to attend a conference, and therefore, an application related to the address of the conference site can be implemented. Compared with an existing videoconferencing system that fails to identify the geographic location of each participant and cannot provide an application related to the geographic location, the embodiment of the present invention can provide the application related to the geographic location of each participant.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
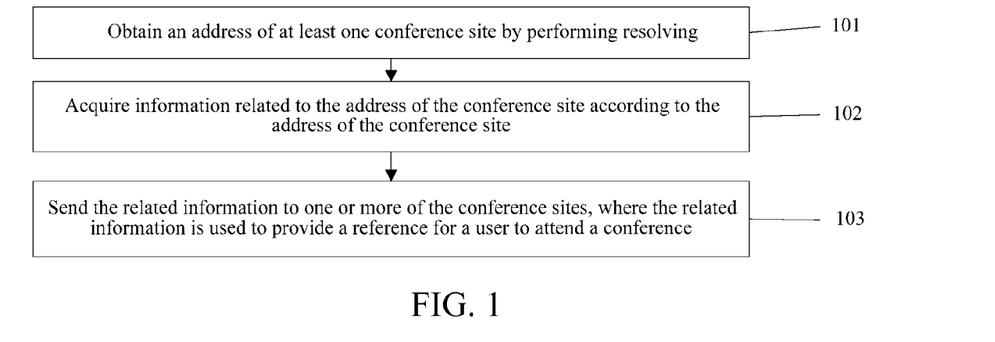
FIG. 1 is a flowchart of a method for implementing a videoconferencing application according to an embodiment of the present invention.

The method for implementing a videoconferencing application according to the embodiment shown in FIG. 1 includes the following steps:

101. Obtain an address of at least one conference site by performing resolving.

When a video conference is held by using a videoconferencing system, a conference site of each participant may be in different places and different conference sites can use different access modes to access the conference. When a conference site is accessed, this step has the capability to obtain the address of the accessed conference site by performing resolving.

102. Acquire information related to the address of the conference site according to the address of the conference site.

103. Send the related information to one or more of the conference sites, where the related information is used to provide a reference for a user to attend the conference.

The embodiment of the present invention has the capability to obtain the address of an accessed conference site by performing resolving, that is, the location of each participant can be known, can acquire information related to the address of the conference site according to the address of the conference site, and send the related information to one or more of the conference sites, where the related information may be used to provide a reference for a user to attend a conference, and therefore, an application related to the address of the conference site can be implemented. Compared with an existing videoconferencing system that fails to identify the geographic location of each participant and cannot provide an application related to the geographic location, the embodiment of the present invention can provide the application related to the geographic location of each participant.

It should be noted that the address of the conference site may be represented as a country/region, such as Beijing, China, during a specific implementation process. Regarding different conference site access modes, different address resolving methods will be used to obtain the address of the conference site by performing resolving. The following describes several common access modes and corresponding address resolving methods, but not limited to the following methods:

Method 1: When a videoconferencing terminal of a conference site is accessed through a public IP network, an access IP address of the videoconferencing terminal of the conference site is resolved to obtain the address of the conference site.

For example, the access IP address of a videoconferencing terminal of a conference site is 219.133.0.1 and the corresponding address can be obtained by performing resolving, which is Futian District, Shenzhen City, Guangdong Province, China;

Method 2: When the videoconferencing terminal of the conference site is accessed through a wireless network, an access number of the videoconferencing terminal of the conference site and the location of a wireless base station closest to the videoconferencing terminal of the conference site are resolved to obtain the address of the conference site. The wireless network includes 2G, 3G, or 4G.

For example, a conference site is accessed through a 3G network by using a mobile phone, where an access number of the conference site is 0086 186xxxxxx and the address of a wireless base station closest to the conference site is Shenzhen, China. The address of the conference site can be obtained by performing resolving, which is Shenzhen, China. For another example, when the mobile phone roams to Beijing, the access number of the conference site is still 0086 186xxxxxxxx, but the address of the wireless base station closet to the conference site is Beijing, China, the address of the conference site can be obtained by performing resolving, which is Beijing, China and the information that the mobile phone roams from Shenzhen, China to Beijing, China can also be obtained;

Method 3: When a satellite positioning device is installed in the conference site, the geographic coordinates of the conference site sent by the satellite positioning device are resolved to obtain the address of the conference site.

During a specific application, the satellite positioning device is installed in the conference site and the geographic coordinates of the conference site acquired by it are sent to the conference main controller by using the satellite positioning device, thereby acquiring information about the country/region/time zone, and the like of the conference site. For example, the geographic coordinates of the conference site sent by the satellite positioning device are 22°31 north, 113°57 east, and therefore, the address of the conference site is obtained by performing resolving, which is Shenzhen City, Guangdong Province, China, and the corresponding time zone is GMT+08:00; and for another example, the geographic coordinates of a conference site sent by the satellite positioning device are 38°52 north, 77° west, and therefore, the address of the conference site can be known, which is Washington, USA, and the corresponding time zone is GMT-05:00.

In addition, another access mode is available: when the videoconferencing terminal of the conference site is accessed through a network with an unknown address, a pre-stored address corresponding to the network with an unknown address is acquired as the address of the conference site. The network with an unknown address includes a dedicated network or a private IP network. It should be noted that when the videoconferencing terminal of the conference site has not been accessed through the network with an unknown address, the address corresponding to the network with an unknown address has been pre-stored. For example, regions at which the video conference is to be held have been decided before a conference is held. In this case, the address of the conference site has been determined.

During a specific application, the network with an unknown address can be pre-edited and saved by using a multifunctional address book. For example, when the conference site accesses the conference through the private IP network, the address of a specific network segment of the private IP network may be defined as a specific region by using the multifunctional address book, and then the address of the conference site can be obtained by performing resolving according to the address corresponding to the network with an unknown address pre-stored in the multifunctional address book.

For example, the IP address of a local area network allocated to a company is defined as 10.10.xxx.xxxx in the multifunctional address book, and the corresponding address is Beijing, China; the IP address is 10.75.xxx.xxx and the corresponding address is Shenzhen, Guangdong, China; and the IP address is 10.100.xxx.xxx and the corresponding address is Moscow, Russia. When an IP address for accessing a conference site is 10.10.27.168, the address of the conference site can be obtained by performing resolving, which is Beijing, China, and the corresponding time zone is GMT+08:00 according to an address corresponding to a network with the IP address 10.10.27.168 pre-stored in the multifunctional address book; and when the IP address for accessing the conference site is 10.100.66.168, the address of the conference site can be obtained by performing resolving, which is Moscow, Russia, and the corresponding time zone is GMT+03:00.

In addition, the multifunctional address book can be used for not only editing and storing an unknown address, but also can support that a user creates an address in it, or edits information about an existing address, or, when an address for accessing a conference site changes, information about the last three addresses for accessing the conference site can be saved in the address book and perform modification in the address book, facilitating user searching and editing. For example, the address Shanghai, China is created for a videoconferencing terminal in the multifunctional address book. When an address for the videoconferencing terminal to access a conference for the first time is the IP 219.133.0.1 of a public network, the saved address corresponding to the videoconferencing terminal is changed from Shanghai, China to Shenzhen, China; when the address for the videoconferencing terminal to access the conference for the second time is the IP 10.10.27.168 of a private network, the saved address corresponding to the videoconferencing terminal is changed to Beijing, China; and when the videoconferencing terminal accesses the conference for the third time through a dedicated network in Shanghai, the saved address Shanghai, China can be directly used, thereby reducing the user editing time.

Further, in step 102, the information related to the conference site is acquired according to the address of the conference site, where the address of the conference site includes one or more combinations of a country, a region, and geographic coordinates and the related information may be a combination of any several types of the following information: geographic coordinates, time zone, current time, and current weather or custom corresponding to the conference site. For example, the obtained conference site address is Shenzhen, China and the geographic coordinates corresponding to Shenzhen, China can be acquired with the help of the Internet or other means, which are 22°31 north, 113°57 east. The time zone is GMT+08:00, the current time is 10:00 on Jun. 2, 2010, and the current weather is sunny and the like. In addition, the custom of the location of each conference site is acquired and may be provided for a user to compare and view. When inconsistent customs exist, the user may be reminded. For example, people in most countries/regions express affirmation or agreement by nodding and express negation or disagreement by shaking their heads. However, it is not the same condition for some countries/regions such as India, Bulgaria, and the like. People in India, Bulgaria, and the like express affirmation or agreement by shaking their heads and express negation or disagreement by nodding. These differences can remind two participants to pay attention to the custom of each other to avoid misunderstandings when both participants use body languages.

Further, step 103, that is, sending the related information to one or more of the conference sites, may specifically be implemented by using the following methods:

Method A: Carry the related information and the conference site ID corresponding to the related information in the control information delivered to each conference site by a server, so that the related information is sent to one or more of the conference sites; or Method B: Add the related information to a conference site list, and a server sends the conference site list to which the related information has been added to one or more of the conference sites, where the related information associates with a conference site ID corresponding to the related information; or Method C: A server overlays the related information onto a conference video transmitted by a corresponding conference site and sends the conference video overlaid with the related information to other conference sites; or Method D: A server overlays the related information and the conference site ID corresponding to the related information onto the conference video transmitted by a corresponding conference site and sends the conference video overlaid with the related information and the conference site ID to other conference sites.

Further, (not shown) the following applications, but not limited to the following applications can be provided for a user by using the information related to the conference site:

Application 1: The address of the conference site and/or the related information are saved on the server, the address of the conference site and/or the related information edited by the user through a videoconferencing terminal of the conference site is received, and the address of the conference site and/or the related information saved on the server are updated according to the information edited by the user.

During a specific implementation process, information about a personality name, the address (such as a country/region) of the conference site, geographic coordinates, current time/time zone, current weather, and the like may be added to a conference list, and information to be displayed and the displaying order may be adjusted as required. For example, the personality name, the address (such as a country/region) of the conference site, the geographic coordinates, the current time/time zone, and the current weather may be displayed simultaneously, and the information to be displayed is Shenzhen headquarters, Shenzhen, China, 22°31 north, 113°57 east, Jun. 2, 2010, 10:00, GMT+08:00, sunny; and may also be adjusted to display only the address of the conference site such as the address of a conference site, which is Washington, USA;

Application 2: The address of the conference site and the related information are displayed in the conference video.

During a specific implementation process, the address of the conference site and the related information may be displayed on the conference video by overlapping OSD subtitles. The displayed location, transparency, font size, and the like can be edited.

For example, the following information is displayed in the top right corner of the conference site video: Shenzhen headquarters, Shenzhen, China, 22°31 north, 113°57 east, Jun. 2, 2010, 10:00, GMT+08:00, sunny.

Application 3: Remind the user of a conference at a scheduled time point or time segment.

For example, conference break reminding may be implemented by using multiple methods. One available method is to remind a conference host that a conference break needs to be implemented when the rest time defined by each participant reaches. For another example, when the lunch time of a conference site is to reach, the conference host is reminded that whether a break and the like need to be arranged. Reminding methods may include but are not limited to conference site subtitle and voice reminding, mobile phone short message reminding, and the like.

Application 4: According to the time zones corresponding to the address of each conference site, the working time of each conference site is determined when the time standard of the same time zone is used, and the time segment in which the working time ranges of conference sites coincide serves as the best conference holding time when the time standard of the same time zone is used; or according to the time zones corresponding to the address of each conference site and the preset available conference time of each conference site, the available conference time of each conference site is determined when the time standard of the same time zone is used, and the time segment in which the available conference time ranges of conference sites coincide is used as the best conference holding time when the time standard of the same time zone is used.

For example, according to the local time and statutory holiday rest time of each conference site, the best conference time may be searched for and is provided for a convener as a reference. During a specific application, a possible implementation solution is as follows: A time segment obtained after the nonworking time of each conference site is excluded may be provided for the convener as a reference. For example, if a conference is held between Beijing, Shenzhen, and Moscow, after the statutory holiday time or lunch time of each conference site is excluded, Beijing time 14:00-17:00 and Moscow time 9:00-12:00 that are best for holding the conference can be obtained and is provided for the convener as a reference.

Application 5: According to their respective geographic coordinates of any two conference sites, the distance between the any two conference sites is calculated; or according to their respective address of any two conference sites, the traffic information between the any two conference sites is acquired by querying a navigation database.

For example, if two conference sites are Beijing, China and Moscow, Russia, and a video conference is held between the two conference sites, the relative space distance can be calculated, which is about 5,800 kilometers, and specifically, may further be shown in 2D or 3D mode. In addition, the traffic information, such as the flight, between the two conference sites may be provided to remind the user how to make a travel more convenient, how long the travel is expected to take, and the like. A possible application scenario is as follows: When an important decision maker of the conference needs to go to another conference site to implement a site conference from the conference site where the decision maker is located, the information, such as the distance and flight, between the two conference sites may be provided for the important decision maker of the conference.

Figure 2:
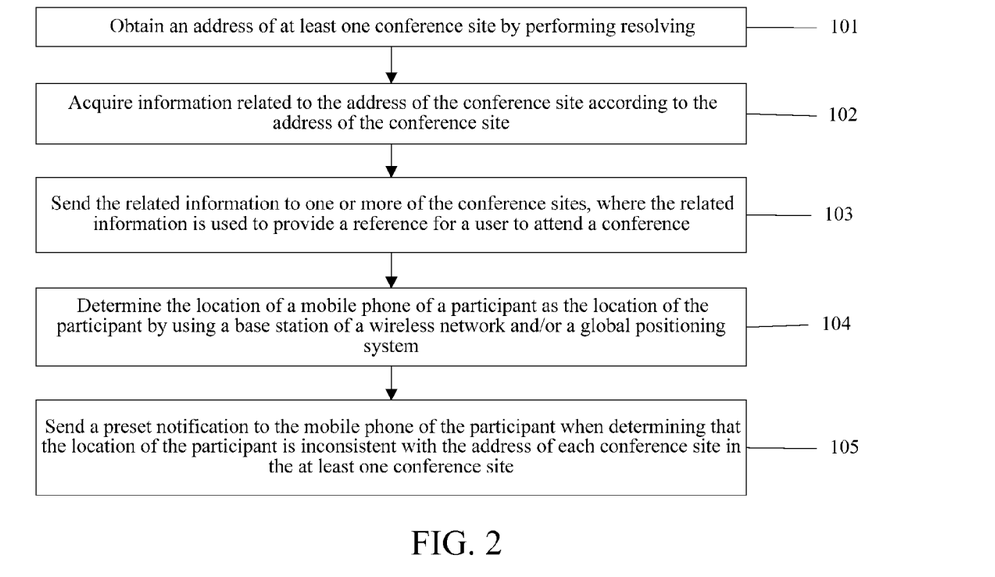
FIG. 2 is a flowchart of another method for implementing a videoconferencing application according to an embodiment of the present invention.

Further, the embodiment of the present invention may further use the address of a participant to provide a corresponding application. As shown in FIG. 2, the method for implementing a videoconferencing application may further include the following steps:

104. Determine the location of a mobile phone of the participant as the location of the participant by using a base station of a wireless network and/or a satellite positioning system, where the mobile phone number of the participant is pre-stored on a server and the mobile phone number of the participant corresponds to the ID of a conference site that the participant is to access.

During a specific application, the location of the participant may be acquired by using a mobile phone positioning technology. Because a mobile terminal (such as a mobile phone) can use a GPS satellite to implement positioning in combination with the base station, a receiver of a mobile terminal of a user can use the GPS satellite to implement positioning at an outdoor place where a satellite signal exists, an error is about 10-50 meters, and when the user enters into an underground parking lot or an indoor place where a GPS satellite signal cannot be received, a positioner of the mobile terminal is automatically switched over to the base station mode.

For example, an address for accessing a conference reserved by a participant is Nanshan District, Shenzhen, China, but the current location that is positioned by using a mobile phone GPS or a base station is Longgang District, Shenzhen, China. In this case, the information may be saved first and a conference host is informed whether corresponding processing needs to be implemented.

105. Send a preset notification to the mobile phone of the participant when determining that the location of the participant is inconsistent with any address of each conference site in the at least one conference site.

The following different applications can be implemented by using a result determined in step 105:

1. In a time range that a conference is in progress, when the location of the participant is consistent with the address of any one conference site in the at least one conference site, it indicates that the participant has arrived at a conference site;

2. When it is determined that the location of the participant is inconsistent with any address of each conference site in the at least one conference site in a preset time range before the conference starts, at least one of the notification information is sent to the mobile phone of the participant: the address of a conference site that the participant is to access, the start time of the conference, the weather of the conference site that the participant is to access, and the traffic information for arriving at the conference site that the participant is to access.

A possible application scenario is as follows: Before the conference starts (for example, three days before the conference starts), a conference site closet to the location of the participant is acquired according to the location of the participant and a conference appointment notification is sent to the participant, where the notification may include the address of the conference site that the participant is to access, the start time of the conference, the weather of the conference site where the participant needs to access the conference, and the traffic information for arriving at the conference site. Assume that the usual place of residence for a participant is Shenzhen but the participant is in Beijing on business before the conference is held. In this case, the conference appointment notification to be sent may be as follows: Beijing time one day 14:00-17:00, the conference is accessed in the Beijing conference site. In addition, the weather condition for arriving at the conference site, the local traffic status, and a self-driving road map may further be sent according to the location of the participant.

Another possible application scenario is as follows: The conference is to be held (for example, 15 minutes before the conference). The current location of the participant is determined by using the mobile phone positioning function of the participant and a voice or short message conference notification is sent to a participant who has not arrive at a conference site range. If the participant is far from the conference site, the real-time weather condition of the location of the conference site, the traffic condition, and a recommended self-driving road map or a recommended traffic way may further be sent;

3. When it is determined that the location of the participant is inconsistent with any address of each conference site in the at least one conference site in a preset time range after the conference starts, the participant is regarded as an absentee for taking statistics and the participant is informed, by using the mobile phone of the participant, to feed back a reason for failing to attend the conference site; and 4. When it is determined that the location of the participant is inconsistent with any address of each conference site in the at least one conference site after the conference starts, the participant is added to the conference by making a call to the mobile phone of the participant if the location of the participant meets a specific security requirement.

For example, if the conference has been held, when the participant who has not attended the conference site needs to be invited to access the conference by making a call to the mobile phone of the participant, the security for the participant to access the conference is determined according to the location of the participant. A possible application scenario is as follows: In some conferences with a high confidentiality level, for the requirement of protecting against leaking a secret, the confidentiality of the location of the participant who is to access the conference is identified to determine whether the participant needs to be invited to access the conference by making a call. After the participant accesses the conference by using the mobile phone, the location of the participant who accesses the conference is repeatedly updated at a certain interval for identification. It is assumed that in an application scenario, when a conference with a high confidentiality level is held and an employee A is in a national office, the employee may be invited to access the conference by making a call. If the employee is in a downtown area, the employee is refused to access the conference for the consideration of security. After the employee A accesses the conference, the employee A moves from the office to the downtown area. In this case, the employee should be interrupted for accessing the conference.

It should be noted that generally, a video TV conference is accessed from multiple conference sites. When whether the location of the participant is consistent with the address of the conference site is determined, the location of the participant should be compared with all accessed conference sites. When the location of the participant is inconsistent with any address of any conference site, it indicates that the participant has not arrived at a conference site.

It can be seen from the videoconferencing system and the execution process of the method for implementing an application on the system that, compared with the prior art that cannot provide an application related to a geographic location of each participant, the videoconferencing system has the capability to provide the application related to the geographic location of each participant. In addition, the method needs to use only an existing network resource to implement the application related to the geographic location of each participant, and the costs are not increased. At the same time, service functions that the videoconferencing system can provide are enriched and the user satisfaction is improved.

Figure 3:
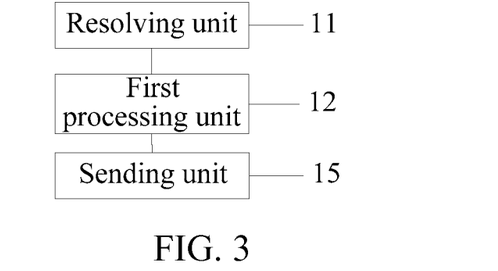
FIG. 3 is a schematic structural diagram of a videoconferencing apparatus according to an embodiment of the present invention.

The embodiment shown in FIG. 3 provides a videoconferencing apparatus including a resolving unit 11, a first processing unit 12, and a sending unit 15, where:

the resolving unit 11 is configured to obtain an address of at least one conference site by performing resolving;

the first processing unit 12 is configured to acquire information related to the address of the conference site according to the address of the conference site; and the sending unit 15 is configured to send the related information to one or more of the conference sites, where the related information is used to provide a reference for a user to attend a conference.

Further, the resolving unit 11 can perform function division and specifically (not shown), can include at least one of the following modules: a first resolving module, a second resolving module, a third resolving module, or a fourth resolving module, where:

when a videoconferencing terminal of a conference site is accessed through a public IP network, the first resolving module is configured to resolve an access IP address of a videoconferencing terminal of the conference site to obtain the address of the conference site;

when the videoconferencing terminal of the conference site is accessed through a wireless network, the second resolving module is configured to resolve an access number of a videoconferencing terminal of the conference site and the location of the wireless base station closest to the videoconferencing terminal of the conference site to obtain the address of the conference site. The wireless network includes 2G, 3G, or 4G;

when a satellite positioning device is installed in the conference site, the third resolving module is configured to resolve the geographic coordinates of the conference site sent by the satellite positioning device to obtain the address of the conference site; or when the videoconferencing terminal of the conference site is accessed through a dedicated network or a private IP network, the fourth resolving module is configured to acquire a pre-stored address corresponding to the dedicated network or the private IP network as the address of the conference site.

Further, (not shown) the sending unit 15 includes at least one of the following modules: first processing module, a second processing module, a third processing module, and a fourth processing module, where:

the first processing module is configured to carry the related information and a conference site ID corresponding to the related information in the control information delivered by the videoconferencing apparatus to each conference site, so that the related information is sent to one or more of the conference sites;

the second processing module is configured to add the related information to a conference site list and send the conference site list to which the related information has been added to one or more of the conference sites, where the related information associates with a conference site ID corresponding to the related information;

the third processing module is configured to overlay the related information onto a conference video transmitted by the corresponding conference site and send the conference video overlaid with the related information to other conference sites; and the fourth processing module is configured to overlay the related information and the conference site ID corresponding to the related information onto the conference video transmitted by the corresponding conference site and send the conference video overlaid with the related information and the conference site ID to other conference sites.

Further, after the first processing unit 12 acquires the information related to the conference site, the apparatus can use the address of the conference site and the related information to provide various applications for a user. To clearly describe specific implementation of various applications, (not shown) the apparatus further includes at least one of the following units: an editing processing unit, a reminding unit, an automatic searching unit, a calculating unit, and a travel reminding unit, where each unit implements an application, where:

the editing processing unit is configured to save the address of the conference site and/or the related information, receive the address of the conference site and/or the related information edited by the user through a videoconferencing terminal of the conference site, and update the address of the conference site and/or the related information saved on the server according to the information edited by the user;

the reminding unit is configured to remind the user of a conference at a scheduled time point or time segment;

the automatic searching unit is configured to determine, according to the time zones corresponding to an address of each conference site, the working time of each conference site when the time standard of the same time zone is used, and use the time segment in which the working time ranges of conference sites coincide as the best conference holding time when the time standard of the same time zone is used; or, the automatic searching unit is further configured to determine, according to the time zones corresponding to an address of each conference site and the preset available conference time of each conference site, the available conference time of each conference site when the time standard of the same time zone is used, and use the time segment in which the available conference time ranges of conference sites coincide as the best conference holding time when the time standard of the same time zone is used;

the calculating unit is configured to calculate the distance between any two conference sites according to their respective geographic coordinates of the any two conference sites; and the travel reminding unit is configured to query a navigation database to acquire the traffic information between any two conference sites according to their respective addresses of the any two conference sites.

Figure 4:
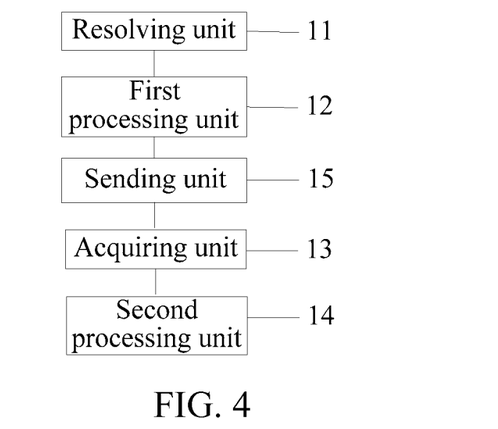
FIG. 4 is a schematic structural diagram of another videoconferencing apparatus according to an embodiment of the present invention.

Further, to enrich an application of the videoconferencing system, the apparatus can further use the location of a participant to provide a related application for the participant. As shown in FIG. 4, the apparatus can further include an acquiring unit 13 and a second processing unit 14, where:

the acquiring unit 13 is configured to determine the location of a mobile phone of the participant as the location of the participant by using a base station of a wireless network and/or a satellite positioning system, where the mobile phone number of the participant is pre-stored in the videoconferencing apparatus and the mobile phone number of the participant corresponds to the ID of a conference site that the participant is to access; and the second processing unit 14 is configured to send a preset notification to the mobile phone of the participant when determining that the location of the participant is inconsistent with any address of each conference site in the at least one conference site.

Further, to clearly describe that the apparatus uses the location of the participant to provide a related application for the participant, (not shown) the second processing unit 14 may include at least one of the following modules: a conference reminding module, an attendance check module, and a supplementary conference access processing module, where each module is configured to describe an application, where:

when determining that the location of the participant is inconsistent with any address of each conference site in the at least one conference site in a preset time range before the conference starts, the conference reminding module is configured to send at least one of the notification information: the address of a conference site that the participant is to access, the start time of the conference, the weather of the conference site that the participant is to access, and the traffic information for arriving at the conference site that the participant is to access, to the mobile phone of the participant;

when determining that the location of the participant is inconsistent with any address of each conference site in the at least one conference site in a preset time range after the conference starts, the attendance check module is configured to regard the participant as an absentee for taking statistics and inform, by using the mobile phone of the participant, the participant to feed back a reason for failing to attend the conference site; and when determining that the location of the participant is inconsistent with any address of each conference site in the at least one conference site after the conference starts, the supplementary conference access processing module is configured to add the participant to the conference by making a call to the mobile phone of the participant if the location of the participant meets a specific security requirement.

Figure 5:
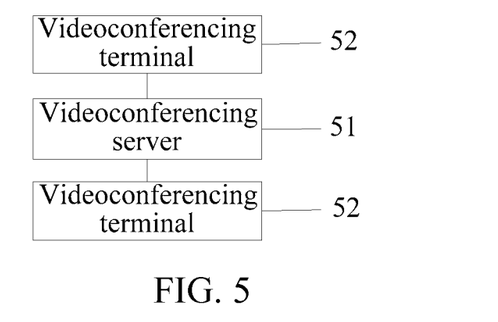
FIG. 5 is a schematic structural diagram of a videoconferencing system according to an embodiment of the present invention.

Accordingly, as shown in FIG. 5, the embodiment of the present invention further provides a videoconferencing system including a videoconferencing server 51 and one or more videoconferencing terminals 52, where:

the videoconferencing server 51 is configured to obtain an address of at least one conference site by performing resolving, acquire information related to the address of the conference site according to the address of the conference site, and send the related information to one or more of the conference sites, where the related information is used to provide a reference for a user to attend a conference; and the conference site accesses the videoconferencing server 51 using the videoconferencing terminal 52; and the videoconferencing terminal 52 is configured to receive the related information sent by the videoconferencing server 51 and provide the related information for the user who attends the conference.

The videoconferencing server 51 included in the videoconferencing system may be the videoconferencing apparatus. Each conference site can access the videoconferencing server 51 by arranging one videoconferencing terminal 52.

The videoconferencing apparatus and system provided by the embodiment of the present invention can obtain the address of an accessed conference site by performing resolving, that is, the location of each participant can be known, can acquire information related to the conference site according to the address of the conference site, and can provide a reference for the user to attend the conference by using the related information, thereby implementing an application related to the address of the conference site. Compared with an existing videoconferencing system that fails to identify the geographic location of each participant and cannot provide an application related to the geographic location, the embodiment of the present invention can provide the application related to the geographic location of each participant.

The embodiment of the present invention is mainly used for a videoconferencing system. When a conference is held by using the videoconferencing system, the videoconferencing system can provide an application related to the geographic location of each participant, enriching service functions that the videoconferencing system can provide and improving the user satisfaction.

The foregoing descriptions are merely exemplary embodiments of the present invention, but not intended to limit the protection scope of the present invention. Any variation or replacement made by persons skilled in the art within the technical scope disclosed in the present invention shall all fall within the protection scope of the present invention. Therefore, the protection scope of the present invention shall be subject to the protection scope of the claims.

What is claimed is:

1. A method for implementing a videoconferencing application, comprising:

obtaining an address of at least one conference site by performing a resolving process;

acquiring information related to the address of the conference site according to the address of the conference site;

sending the related information to one or more of conference sites, where the related information is used to provide a reference for a user to attend a conference;

determining a location of a mobile phone of a participant as a location of the participant by using at least one of a base station of a wireless network and a satellite positioning system, wherein a mobile phone number of the participant is pre-stored on a server and the mobile phone number of the participant corresponds to an identification (ID) of a conference site that the participant is to access; and sending a preset notification to the mobile phone of the participant when determining that the location of the participant is inconsistent with any address of each conference site in the at least one conference site.

2. The method for implementing the videoconferencing application according to claim 1, wherein the obtaining the address of the at least one conference site by performing the resolving process comprises one step of the group consisting of:

resolving an access Internet Protocol (IP) address of a videoconferencing terminal of the conference site to obtain the address of the conference site when the videoconferencing terminal of the conference site is accessed through a public IP network;

resolving an access number of the videoconferencing terminal of the conference site and a location of a wireless base station closest to the videoconferencing terminal of the conference site to obtain the address of the conference site when the videoconferencing terminal of the conference site is accessed through a wireless network;

resolving geographic coordinates of the conference site sent by a satellite positioning device to obtain the address of the conference site when the satellite positioning device is installed in the conference site; and acquiring a pre-stored address corresponding to a dedicated network or a private IP network as the address of the conference site when the videoconferencing terminal of the conference site is accessed through the dedicated network or the private IP network.

3. The method for implementing the videoconferencing system application according to claim 1, wherein the sending the related information to one or more of conference sites comprises one step of the group consisting of:

carrying the related information and a conference site identification (ID) corresponding to the related information in control information delivered by a server to each conference site, so that the related information is sent to the one or more of the conference sites;

adding the related information to a conference site list and sending, by the server, the conference site list to which the related information has been added to the one or more of the conference sites, where the related information associates with the conference site ID corresponding to the related information;

overlaying, by the server, the related information onto a conference video transmitted by a corresponding conference site and sending, by the server, the conference video overlaid with the related information to other conference sites; and overlaying, by the server, the related information and the conference site ID corresponding to the related information onto the conference video transmitted by a corresponding conference site and sending, by the server, the conference video overlaid with the related information and the conference site ID to other conference sites.

4. The method for implementing the videoconferencing application according to claim 1, wherein:

the address of the conference site comprises one or more combinations of a country, a region, and geographic coordinates; and the related information comprises one or more combinations of a time zone, current time, and current weather corresponding to the address of the conference site.

5. The method for implementing the videoconferencing system application according to claim 1, further comprising one step of the group consisting of:

saving, on the server, at least one of the address of the conference site and the related information, receiving the at least one of address of the conference site and the related information edited by the user through the videoconferencing terminal of the conference site, and updating the at least one of address of the conference site and the related information saved on the server according to the information edited by the user;

reminding the user of a conference at a scheduled time point or time segment;

determining, according to time zones corresponding to an address of each conference site, working time of each conference site when a time standard of a same time zone is used, and using the time segment in which working time ranges of the conference sites coincide as the best conference holding time, when the time standard of the same time zone is used;

determining, according to time zones corresponding to the address of each conference site and preset available conference time of each conference site, available conference time of each conference site, when the time standard of the same time zone is used, and using the time segment in which available conference time ranges of conference sites coincide as the best conference holding time when the time standard of the same time zone is used;

calculating a distance between any two conference sites according to their respective geographic coordinates of the any two conference sites; and querying a navigation database and acquiring traffic information between any two conference sites according to their respective addresses of the any two conference sites.

6. The method for implementing the videoconferencing application according to claim 1, wherein the sending the preset notification to the mobile phone of the participant when determining that the location of the participant is inconsistent with any address of each conference site in the at least one conference site comprises:

sending at least one of the following notification information:
(a) an address of the conference site that the participant is to access,
(b) a start time of the conference,
(c) weather of the conference site that the participant is to access, and
(d) traffic information for arriving at the conference site that the participant is to access,
to the mobile phone of the participant, when determining that the location of the participant is inconsistent with any address of each conference site in the at least one conference site in a preset time range before the conference starts.

7. The method for implementing the videoconferencing application according to claim 1, wherein the sending a preset notification to the mobile phone of the participant when determining that the location of the participant is inconsistent with any address of each conference site in the at least one conference site comprises:
regarding the participant as an absentee for taking statistics and informing, by using the mobile phone of the participant, the participant to feed back a reason for failing to attend the conference site when determining that the location of the participant is inconsistent with any address of each conference site in the at least one conference site in a preset time range after the conference starts.

8. The method for implementing the videoconferencing application according to claim 1, wherein the sending the preset notification to the mobile phone of the participant when determining that the location of the participant is inconsistent with any address of each conference site in the at least one conference site comprises:
adding the participant to the conference by making a call to the mobile phone of the participant if the location of the participant meets a specific security requirement, when determining that the location of the participant is inconsistent with any address of each conference site in the at least one conference site after the conference starts.

9. A videoconferencing apparatus, comprising:
a resolving unit, configured to obtain an address of at least one conference site by performing a resolving process;
a first processing unit, configured to acquire information related to the address of the conference site according to the address of the conference site;
a sending unit, configured to send the related information to one or more of conference sites, where the related information is used to provide a reference for a user to attend a conference;
an acquiring unit, configured to determine a location of a mobile phone of a participant as a location of the participant through at least one of a base station of a wireless network and a satellite positioning system, wherein a mobile phone number of the participant is pre-stored in the videoconferencing apparatus and the mobile phone number of the participant corresponds to an identification (ID) of a conference site that the participant is to access; and
a second processing unit, configured to send a preset notification to the mobile phone of the participant when it is determined that the location of the participant is inconsistent with any address of each conference site in the at least one conference site.

10. The videoconferencing apparatus according to claim 9, wherein the resolving unit comprises at least one of the following modules:

a first resolving module, configured to resolve an access Internet Protocol (IP) address of a videoconferencing terminal of the conference site to obtain the address of the conference site when the videoconferencing terminal of the conference site is accessed through a public IP network;
a second resolving module, configured to resolve an access number of the videoconferencing terminal of the conference site and a location of a wireless base station closest to the videoconferencing terminal of the conference site to obtain the address of the conference site when the videoconferencing terminal of the conference site is accessed through a wireless network;
a third resolving module, configured to resolve geographic coordinates of the conference site sent by a satellite positioning device to obtain the address of the conference site when the satellite positioning device is installed in the conference site; and
a fourth resolving module, configured to acquire a pre-stored address corresponding to a dedicated network or a private IP network as the address of the conference site when the videoconferencing terminal of the conference site is accessed through the dedicated network or the private IP network.

11. The videoconferencing apparatus according to claim 9, wherein the sending unit comprises at least one of the following modules:
a first processing module, configured to carry the related information and a conference site identification (ID) corresponding to the related information in control information delivered to each conference site by the videoconferencing apparatus, so that the related information is sent to the one or more of the conference sites;
a second processing module, configured to add the related information to a conference site list and send the conference site list to which the related information has been added to one or more of the conference sites, where the related information associates with the conference site ID corresponding to the related information;
a third processing module, configured to overlay the related information onto a conference video transmitted by a corresponding conference site and send the conference video overlaid with the related information to other conference sites; and
a fourth processing module, configured to overlay the related information and the conference site ID corresponding to the related information onto the conference video transmitted by a corresponding conference site and send the conference video overlaid with the related information and the conference site ID to other conference sites.

12. The videoconferencing apparatus according to claim 9, further comprising at least one of the following units:
an editing processing unit, configured to save at least one of the address of the conference site and the related information, receive at least one of the address of the conference site and the related information edited by the user through a videoconferencing terminal of the conference site, and update at least one of the address of the conference site and the related information saved on the server according to the information edited by the user;
a reminding unit, configured to remind the user of a conference at a scheduled time point or time segment;
an automatic searching unit, configured to determine, according to time zones corresponding to an address of each conference site, working time of each conference site when a time standard of a same time zone is used, and use the time segment in which working time ranges of conference sites coincide as the best conference holding time, when the time standard of the same time zone is used;

wherein the automatic searching unit is further configured to determine, according to time zones corresponding to the address of each conference site and preset available conference time of each conference site, available conference time of each conference site, when the time standard of the same time zone is used, and use the time segment in which available conference time ranges of conference sites coincide as the best conference holding time when the time standard of the same time zone is used;

a calculating unit, configured to calculate a distance between any two conference sites according to their respective geographic coordinates of the any two conference sites; and a travel reminding unit, configured to query a navigation database to acquire the traffic information between any two conference sites according to their respective addresses of the any two conference sites.

13. The videoconferencing apparatus according to claim 9, wherein the second processing unit comprises at least one of the following modules:

a conference reminding module, configured to send at least one of the following notification information:
  (a) the address of the conference site that the participant is to access,
  (b) a start time of the conference,
  (c) weather of the conference site that the participant is to access, and
  (d) traffic information for arriving at the conference site that the participant is to access,
to the mobile phone of the participant when determining that the location of the participant is inconsistent with any address of each conference site in the at least one conference site in a preset time range before the conference starts;

an attendance check module, configured to regard the participant as an absentee for taking statistics and inform, by using the mobile phone of the participant, the participant to feed back a reason for failing to attend the conference site when it is determined that the location of the participant is inconsistent with any address of each conference site in the at least one conference site in a preset time range after the conference starts; and a supplementary conference access processing module, configured to, when determining that the location of the participant is inconsistent with any address of each conference site in the at least one conference site after the conference starts, add the participant to the conference by making a call to the mobile phone of the participant if the location of the participant meets a specific security requirement.

14. A videoconferencing system, comprising:

a videoconferencing apparatus, comprising:

a resolving unit, configured to obtain an address of at least one conference site by performing a resolving process;

a first processing unit, configured to acquire information related to the address of the conference site according to the address of the conference site;

a sending unit configured to send the related information to one or more of conference sites, where the related information is used to provide a reference for a user to attend a conference;

an acquiring unit, configured to determine a location of a mobile phone of a participant as a location of the participant through at least one of a base station of a wireless network and a satellite positioning system, wherein a mobile phone number of the participant is pre-stored in the videoconferencing apparatus and the mobile phone number of the participant corresponds to an identification (ID) of a conference site that the participant is to access; and a second processing unit, configured to send a preset notification to the mobile phone of the participant when it is determined that the location of the participant is inconsistent with any address of each conference site in the at least one conference site;

the conference site accesses the videoconferencing apparatus using a videoconferencing terminal; and the videoconferencing terminal, configured to receive the related information sent by the videoconferencing apparatus and provide the related information for the user who attends the conference.

* * * * *

UNITED STATES PATENT AND TRADEMARK OFFICE
CERTIFICATE OF CORRECTION

PATENT NO. : 8,842,157 B2  
APPLICATION NO. : 13/720561  
DATED : September 23, 2014  
INVENTOR(S) : Wang et al.

Page 1 of 1

It is certified that error appears in the above-identified patent and that said Letters Patent is hereby corrected as shown below:

Title Page, Item (71) Applicant, in both instances "Guangdong (CN)" should read --Shenzhen (CN)--.

Signed and Sealed this  
Ninth Day of June, 2015

Michelle K. Lee  
*Director of the United States Patent and Trademark Office*